C. CROOK.
Harvester.
No. 548. Reissued May 4, 1858.
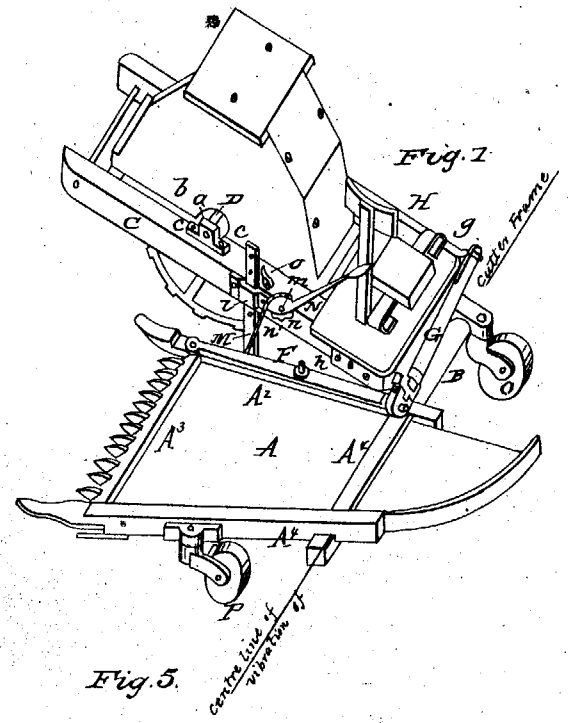
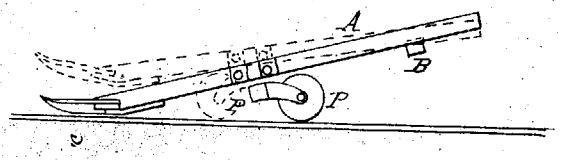
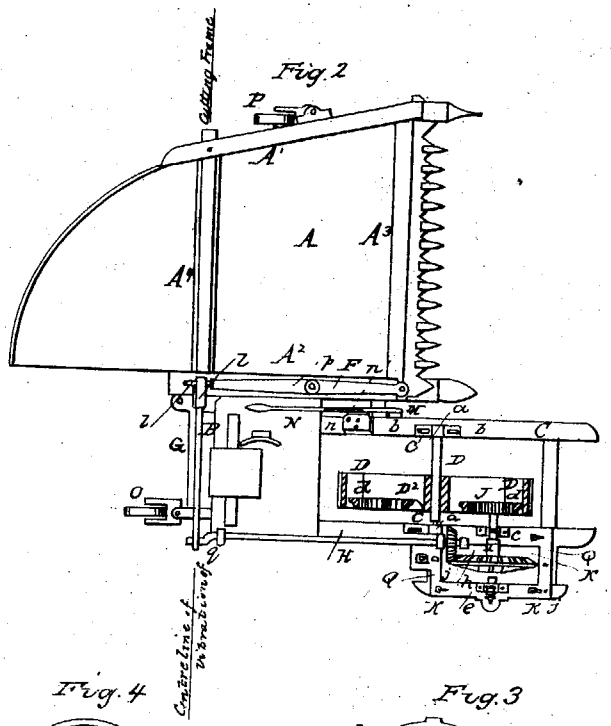
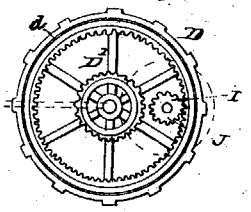
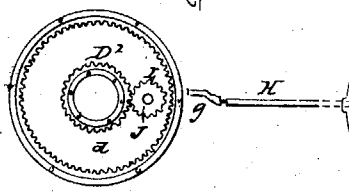
N. PETERS. Photo-Lithographer. Washington, D. C.

UNITED STATES PATENT OFFICE.

CHARLES CROOK, OF NEW HOPE, PENNSYLVANIA.

IMPROVEMENT IN HARVESTERS.

Specification forming part of Letters Patent No. 17,205, dated May 5, 1857; Reissue No. 548, dated May 4, 1858.

*To all whom it may concern:*

Be it known that I, CHARLES CROOK, of New Hope, Bucks county, State of Pennsylvania, have invented certain new and useful Improvements in Mowing and Reaping Machines; and I do hereby declare the following to be a full, clear, and exact description of the same, reference being had to the accompanying drawings, and to the letters of reference marked thereon.

My invention consists in an arrangement and combination of adjustable gearing, fully described hereinafter, by which the speed of the cutters may be readily changed, and in a peculiar and peculiarly-situated device, fully set forth hereinafter, for communicating motion from the aforesaid gearing to the cutters.

In order to enable others skilled in the art to make and use my invention, I will proceed to describe its construction and operation.

On reference to the drawings, which form a part of this specification, Figure 1 is a perspective view of a mowing and reaping machine illustrating my improvements; Fig. 2, a ground plan, with part of the gearing in section; Figs. 3 and 4, views of the driving-gear; Fig. 5, an end view of the off side of the cutter-frame.

Similar letters refer to similar parts throughout the several views.

A represents the platform, attached to the cutter-frame, which is composed of the outside bar, A′, the inside bar, $A^2$, the front bar, $A^3$, and the back bar, $A^4$. A rounded continuation, B, of the latter, and with it the whole cutter-frame, turns in brackets on the main frame C of the machine.

D is the main driving-wheel, secured to the shaft D′, which turns in boxes *a a*. These boxes have oblong slots *c c*, through which bolts or screws pass into the main frame, so that the boxes, and with them the shaft D′ and its driving-wheel D, may be adjusted at pleasure.

To the driving-wheel is secured the usual internal gear-wheel, *d*, as well as the cog-wheel $D^2$, both having teeth adapted to gear into those of the pinion J, which is secured to the end of the shaft I, the latter turning in boxes *e e*, attached to a plate, Q, which is secured to the main frame. This plate may be made adjustable by allowing the screws or bolts *k* to pass through oblong slots *j*. It is not necessary, however, that both the boxes *a a* and the plate Q, with its boxes *e e*, should be adjustable. Either one or the other may be permanently secured to the main frame.

On the shaft I is a bevel-wheel, K, gearing into the bevel-pinion *h* on the shaft H, which turns in brackets on the main frame, and the end of which is formed into a crank, *g*. To the latter is connected one end of the rod G, the opposite end being connected by means of a swivel-joint, *i*, to one arm of the lever F, which has its fulcrum on a pin, *p*, attached to the inside bar, $A^2$, of the cutter-frame, the opposite end of the lever being pivoted to the cutter-bar E. A caster, O, supports the rear of the main frame, and the off end of the cutter-frame is supported on the caster P.

To the inside bar, $A^2$, of the cutter-frame, and between the center of vibration of the latter and the cutters is jointed the bar M, which passes through and is guided by the staple *l* on the main frame. A lever, N, has its fulcrum on a pin attached to the main frame, and to this lever are secured the segment *m* of a pulley and the ratchet-wheel *n*. To the former is attached the cord or chain *n′*, the lower end of which is connected to the bar M, and the teeth of the ratchet-wheel are adapted to the pawl *o*, which is hinged to the main frame, and which serves to retain the cutter-frame in the position to which it may have been raised by the lever N.

Operation: When used for reaping the cutters are raised to the requisite height by the lever N. The plate Q, with its boxes *e e*, or the boxes *a a* are so adjusted that the teeth of the pinion J shall gear into those of the internally-geared wheel *d*, so that as the machine is drawn over the ground a rapid rotary motion will, through the bevel-wheels K and *h*, be imparted to the shaft H, and through the cranked end *g* of the latter shaft, connecting-rod G, and lever F the necessary rapid reciprocating motion must be imparted to the cutters. When the machine has to be used for mowing the platform A is removed from the cutter-frame, the cutters lowered, and the speed of the latter reduced by bringing the pinion J into gear with the spur-wheel $D^2$. As the outer end of the swivel-joint *i* turns on the rounded end of the arm of the lever F, and as the inner end of the joint is allowed to turn freely on the end of the connecting-rod G, and as the latter is in close proximity to the center-line of vibration of the cutter-frame, it is evident that the cutters may be raised and lowered at pleasure without disarranging the proper working position of either the rods or the lever or causing any interruption in the operation of the machine.

I claim and desire to secure by Letters Patent—

1. Operating and changing the speed of the cutters by means of the internally-geared wheel I and spur-wheel $D^2$, in combination with the pinion J, the same being arranged and rendered adjustable substantially as herein set forth, and for the purpose specified.

2. Connecting the rod G to the end of the lever F by means of the swivel-joint *i*, when the said joint is situated at or near the center of vibration of the cutter-frame.

In testimony whereof I have signed my name to this specification before two subscribing witnesses.

CHS. CROOK.

Witnesses:
HENRY HOWSON,
HENRY ODIORNE.